United States Patent
Holzner et al.

(10) Patent No.: US 6,501,885 B2
(45) Date of Patent: Dec. 31, 2002

(54) OPTICAL WAVEGUIDE COUPLER AND METHOD FOR PRODUCING SAME

(75) Inventors: Reto Holzner, Zurich; Thomas Brunschwiler, Arbon; Josef Wagner; Alex Dommann, both of Buchs, all of (CH); Andreas Mündle, Satteins (AT); Jakob Jütz, Grabs (CH)

(73) Assignee: Contraves Space AG, Zurich (CH)

( * ) Notice: Subject to any disclaimer, the term of this patent is extended or adjusted under 35 U.S.C. 154(b) by 43 days.

(21) Appl. No.: 09/757,914

(22) Filed: Jan. 10, 2001

(65) Prior Publication Data

US 2002/0003929 A1 Jan. 10, 2002

(30) Foreign Application Priority Data

Jan. 13, 2000 (CH) ................................................ 0061/00

(51) Int. Cl.[7] .................................................. G02B 6/26
(52) U.S. Cl. .............................. 385/39; 385/46; 385/14
(58) Field of Search ............................ 385/39, 14, 42, 385/46, 27

(56) References Cited

U.S. PATENT DOCUMENTS

| | | | |
|---|---|---|---|
| 5,173,097 A | 12/1992 | Jansen | 65/3.15 |
| 5,311,604 A | 5/1994 | Rogner et al. | 385/14 |
| 5,343,546 A * | 8/1994 | Cronin et al. | 385/52 |
| 5,628,917 A | 5/1997 | MacDonald et al. | 216/2 |
| 5,636,298 A | 6/1997 | Jiang et al. | 385/14 |
| 5,963,687 A | 10/1999 | Schneider | |

FOREIGN PATENT DOCUMENTS

| | | |
|---|---|---|
| EP | 0 649 039 A1 | 4/1995 |
| JP | 07035935 | 2/1995 |

* cited by examiner

Primary Examiner—Phan T. H. Palmer
(74) Attorney, Agent, or Firm—McCormick, Paulding & Huber LLP

(57) ABSTRACT

The optical waveguide coupler comprises a structure (1) of a number of elongated narrow optical waveguide strips (2), which consist respectively of a front area (3), a center area (4) and a coupling area (5). The center area (4) has respective transition areas (6) and (7) to the corresponding area (3) or (5). A gap (9) in the front areas (3) provided between two adjoining strips (2) is larger than the thickness of the narrow strips (2). The front faces (8) of the front areas (3), and the front faces of the coupling areas (5) are embodied to be as smooth as possible, wherein all strips form a stack in the coupling area (5). The gaps are pits which result from etching of an Si substrate with the aid of a DRIE etching process.

20 Claims, 2 Drawing Sheets

OPTICAL WAVEGUIDE COUPLER AND METHOD FOR PRODUCING SAME

FIELD OF THE INVENTION

The invention relates to an optical waveguide coupler with a number of elongated narrow optical waveguide strips, each of which has a front area, a center area and a coupling area, in that the center area respectively comprises a transition area toward the corresponding front area, or toward the coupling area in such a way that the distance between two adjoining strips is greater in the front area than the thickness of the narrow strips, and wherein the strips form a stack in the coupling area. The invention further relates to a method of producing such an optical waveguide coupler.

BACKGROUND OF THE INVENTION

A structure of optical waveguides of this type is known from U.S. Pat. No. 5,343,546. In this embodiment, the individual optical waveguides are held without substrates, wherein each individual optical waveguide itself is turned in such a way that a transition from a vertical to a horizontal position results from this.

A method of producing optical fibers is furthermore known from U.S. Pat. No. 5,173,097. In accordance with this method, optical fibers of very small dimensions are produced by drawing the fibers while they are in the plastic state. The thin fibers can then be employed in a stacked form for actual uses, such as for producing optical waveguide couplers, for example.

A further method of producing optical waveguides is known from U.S. Pat. No. 5,963,687, which was published during the priority period. In accordance with this method, a glass-producing material is deposited with the aid of a very thin flame on a substrate, and its thickness is achieved by means of a suitable relative movement between the flame and the substrate.

Sometimes optical waveguide couplers are used in connection with miniaturized optical systems. Such waveguide couplers are components which make it possible to couple the light emitted by a number n of transmitting elements, in particular laser diodes, into at least one optical waveguide. Such a waveguide coupler can, for example, have a number n of inputs and a single output. These inputs and outputs of known optical waveguide couplers are themselves optical waveguides per se. Only such optical waveguides make miniaturization possible, because it is not possible in actuality to represent a number n of emitting diode surfaces, for example by means of a lens and mirror system, in a very small space on the core diameter of an output optical waveguide.

Such optical waveguide couplers operate very well per se, but are relatively elaborate.

OBJECT AND SUMMARY OF THE INVENTION

It is therefore the object of the invention to produce an optical waveguide coupler which is less elaborate.

This object is attained in an advantageous manner by means of an optical waveguide coupler with a number of elongated narrow optical waveguide strips, each of which has a front area, a center area and a coupling area. The center area comprises a transition area toward the corresponding front area, or toward the coupling area such that the distance between two adjoining strips is greater in the front than the thickness of the narrow strips, and the strips form a stack in the coupling area. The optical waveguide coupler is constituted by a structure of a substrate with pits and strips between the pits. The strips in the form of the optical waveguide strips comprise at least partially a material of the substrate, or an optical waveguide material, which constitutes the optical waveguide strips, is embedded in the pits.

It is a further object of the invention to provide a method for producing an optical waveguide coupler.

This object is attained by means of the method in for producing an optical waveguide coupler in which for producing a positive structure, a desired number of strips with lateral walls between the pits is created by forming pits in a substrate, and subsequently the pits are filled with a filler material. Alternatively, for producing a negative structure a number of pits corresponding to the desired number of strips is produced in a substrate, and then these pits are filled with a transparent filler material, so that the actual optical lightwave strips are created.

The optical waveguide coupler in accordance with the invention combines in an advantageous manner, the light output from n transmitting elements basically without output losses. Therefore the structural outlay for such systems can be significantly reduced, which in the end permits the realization of Microsystems.

Further advantageous embodiments of the invention ensue from the further dependent claims.

The invention will be explained by way of example in what follows, making reference to the drawings.

DETAILED DESCRIPTION OF THE PREFERRED EMBODIMENTS

Figure 1:
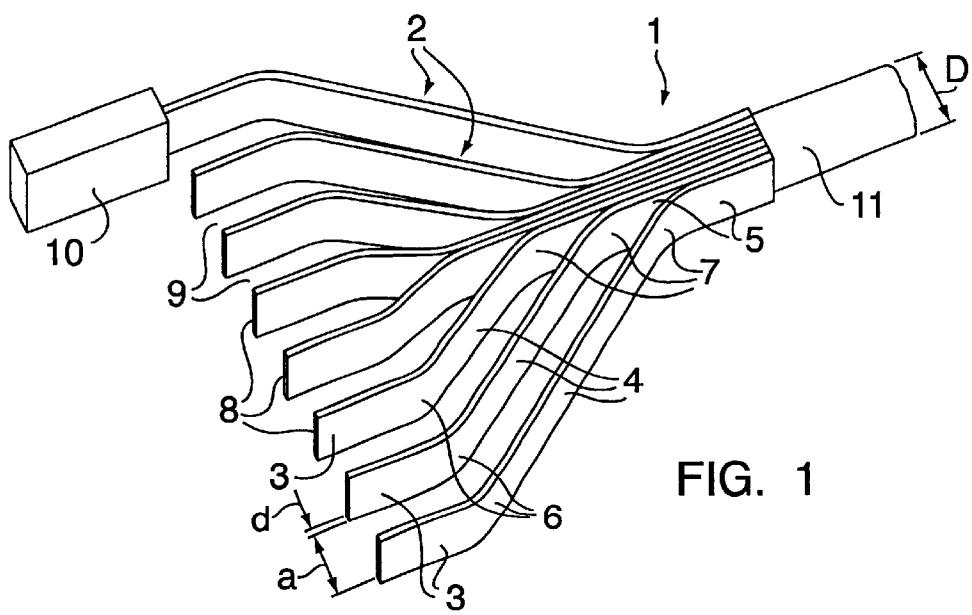
FIG. 1 is a schematic representation of a preferred structure of the optical waveguide coupler in accordance with the invention, FIG. 2 a schematic section through all front areas of a first embodiment of such a structure, which in accordance with the invention is also called a positive structure, FIG. 3, a schematic section through all front areas of a second embodiment of such a structure, which in accordance with the invention is also called a negative structure, FIG. 4, a schematic representation of two strips of a positive structure, arranged next to each other, FIG. 5 a schematic lateral view of a substrate for an optical waveguide coupler in accordance with the invention, and FIG. 6, a schematic top plan view on this substrate.

The structure 1 of an optical waveguide coupler in accordance with the invention represented in FIG. 1 comprises a number, i.e. 8, of elongated narrow optical waveguide strips 2, which are arranged symmetrically in pairs in respect to a reference plane. These strips 2 are transparent and have a refractive index $n_s$. Each strip has a front area 3, a center area 4 and a coupling area 5. The center area 4 respectively comprises transition areas 6 and 7 toward the corresponding end area 3, or 5. The front areas 3 of all strips form planes which are parallel to the reference plane in such a way that there the gap a between two adjoining strips is noticeably larger than the thickness d of the narrow strips 2. The thickness d can, for example, be 5 μm, and the gap a 1 to 4 mm. The radius of curvature of the transition areas 6 and 7 is preferably greater than 5/d. The coupling areas 5 of all strips also form parallel planes, but in such a way, that there the gap between two adjoining strips is more likely narrower, preferably vanishingly narrow, and in any case not much wider than the thickness d of the narrow strips 2. The front faces 8 of the front areas 3, which are embodied to be as flat as possible, are located in a plane which is perpendicular in respect to the reference plane. The coupling areas 5 of all strips are stacked laterally next to each other and connected with each other, and the front faces of these coupling areas 5, which are also embodied to be as flat as possible, are also located in a further plane, which is perpendicular in respect to the reference plane.

The strips 2 can consist of a material which is transparent to a desired frequency spectrum. Small silicon plates, which otherwise are also used as the substrate 12 (FIG. 2), are particularly well suited for some applications. There are spaces 9, also called interstices, between the strips 2, which can be filled with a suitable filler material, or with a suitable hardening filler, for example an adhesive, photosensitive resist, polymer, etc., up to their confluence in the areas 5.

The system in accordance with FIG. 1 comprises respective transmitting elements for each optical waveguide strip 2, wherein only one transmitting element 10 is represented in the drawing. Each one of the luminous surfaces of these transmitting elements 10 which, for example, can be diode lasers, is arranged opposite a front face 8 of a front area 3 of a strip 2. The front face of an output optical waveguide, or preferably of an optical fiber 11, is arranged opposite the front faces of the coupling areas 5 of all strips. The diameter D of the optical fiber 11 therefore is equal to the height h of the strips 2, which can be 100 µm, for example.

Figure 2:
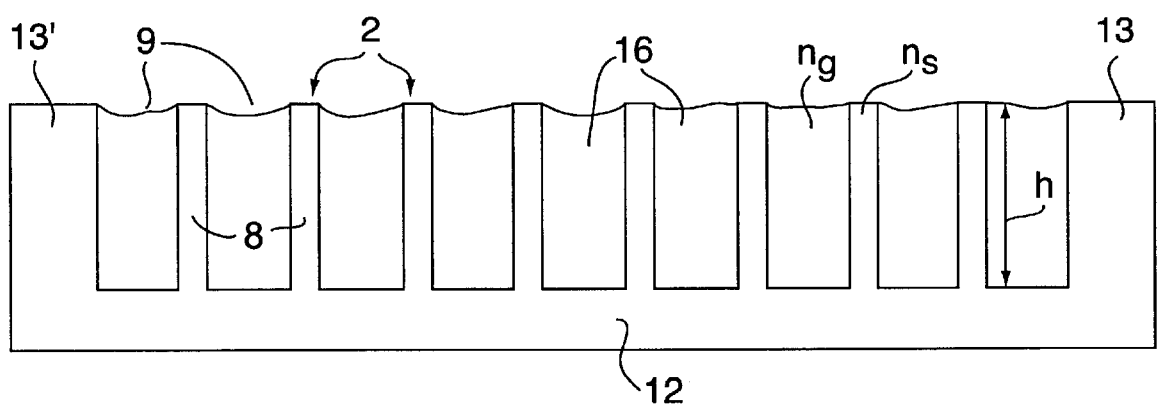

FIG. 2 shows a cross section perpendicularly through the front areas 3 of a positive structure of an optical waveguide coupler with the substrate 12 and eight strips 2, formed by etching, for example, and two inactive edge areas 13, 13' which, however, could also be omitted. In this case the interstices 9 have been filled with an adhesive 16, for example. The elongated surface 8 in FIG. 2 represents the front face of an optical waveguide strip, which is located in close contact with a transmitting element 10. The interstices are of course much narrower than in the representation in FIG. 2.

Figure 3:
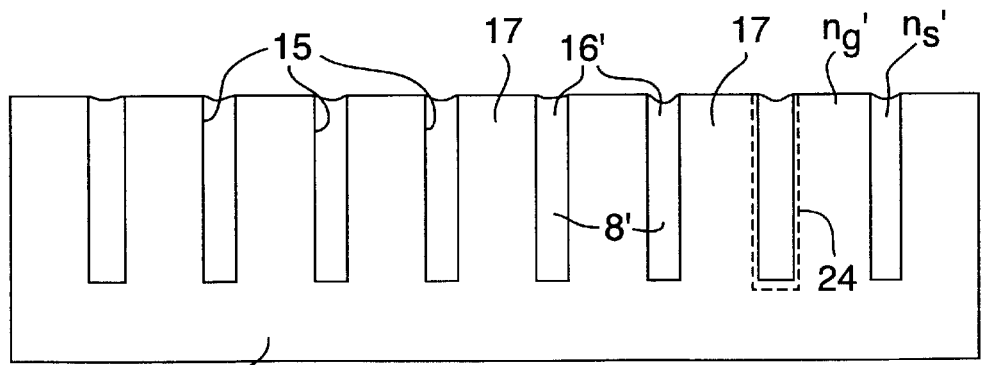

FIG. 3 shows a cross section perpendicularly through corresponding front areas of a negative structure of an optical waveguide coupler with a substrate 14 and eight pits 15, formed by etching, for example, which can be filled with a transparent adhesive, which in this case constitutes the material of the optical waveguide strips 16'. The front faces 8' of the optical waveguide strips 16' extend parallel with the plane of projection and are smooth. This can be accomplished by polishing or casting. Since these front faces are in close contact with each transmitting element 10, the light can pass through the optical lightwave strips. In the area 5 (FIG. 1) the walls 17 between the pits 15 are of course much narrower than in the area 3 (FIG. 3).

Figure 4:
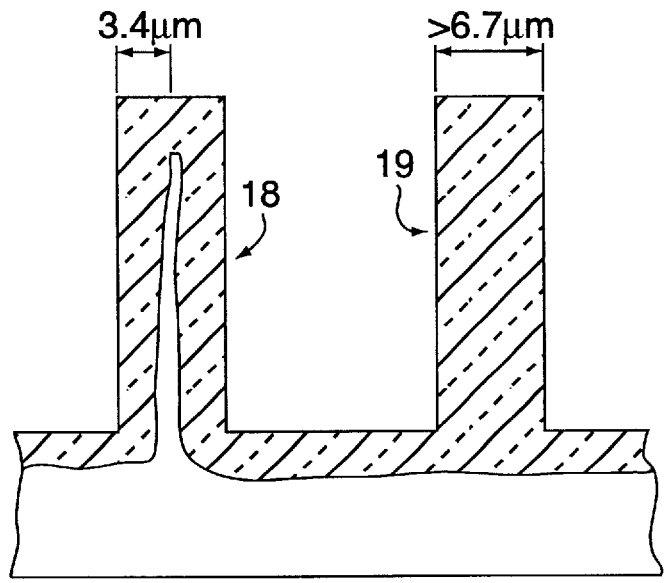

In FIGS. 2 and 3 it can be seen that the strips 2, or 16', and the diode lasers 10 are arranged vertically in respect to the base surface of the substrate 12, or 14. For example, the optical lightwave strips 2 are formed from silicon of a height of preferably between 30 to 300 µm and a thickness between 0.6 µm to 10 µm, in particular 100×2 µm. With the positive structure, this silicon strip can be oxidized through, so that such strips then basically consist of $SiO_2$, which is a material which lets light through very well. FIG. 4 schematically represents an Si strip 18, which is not completely oxidized through, and an Si strip 19, which is completely oxidized through.

An optical waveguide coupler of the structure in accordance with FIGS. 1 to 4 functions as follows:

The light emitted from each one of the n transmitting elements is coupled in, with or without optical image forming, at the front of an optical waveguide strip 2 namely, in the representation in accordance with FIGS. 2 and 3, into the front faces 8, or 8' perpendicular in respect to the plane of projection. The cross-sectional shape and the cross-sectional surface of each optical waveguide strip correspond, except for differences to be defined, to the emitting surface of one of the n transmitting elements 10. The front faces of all n parallel-guided optical waveguide strips in the coupling area 5, plus the spaces between them, form a surface which is called a coupling surface, and which can be connected at the front with the output optical waveguides, but preferably with an optical fiber 11 (FIG. 1). The light emitted by the transmitting elements is conducted over all strips, so that the light output at the optical waveguide 11 is much greater than that of a single transmitting element. This light output can for example be even greater than 0.7 times n. Since the interstices 9' at the front end of the optical waveguides (FIG. 1) are relatively large, this side of the optical waveguide couplers provides sufficient space for housing the diode lasers and the relatively large associated elements, since the diode lasers must also be supplied with electricity and therefore radiate a certain amount of heat, for example of an order of magnitude of 3 Watt per diode, which must be removed. For example, glued-on so-called diamond surfaces or copper blocks of a size of 1 mm by 2 to 3 mm can be used for cooling the diodes.

Figure 5:
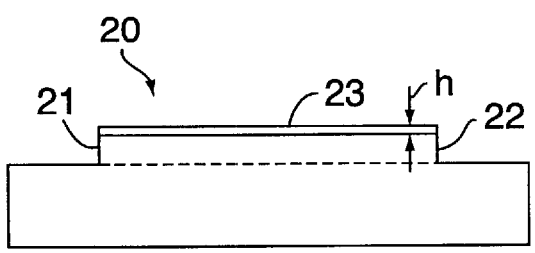
Figure 6:
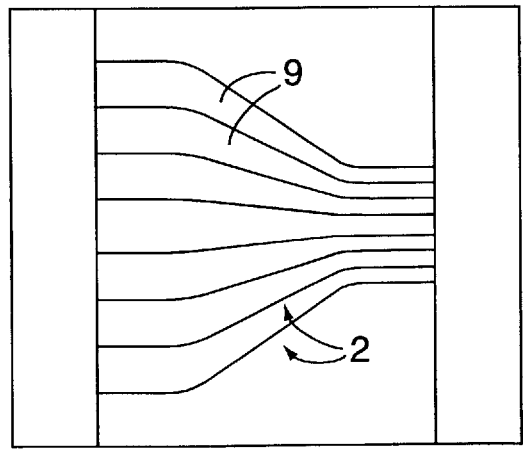

For producing an optical waveguide coupler in accordance with the invention it is possible, for example and as represented in FIG. 5, to start with a small silicon plate or wafer 20 with two shoulders 21 and 22, between which a slightly raised area 23 is located. In case of a positive structure, the desired number of strips 2 in the form of vertical walls is produced in a first method stage by etching in accordance with a technology known per se. For example, eight such strips are represented in FIG. 6. In a second method stage, these upward protruding walls are oxidized, preferably oxidized through, wherein the substrate 12 is also partially oxidized, which poses no problem and can even be desirable. Otherwise the oxidation of the substrate can be avoided by means of a suitable covering. The oxidized zones shown in dashed lines in FIG. 4, consist of $SiO_2$ and are therefore sufficiently transparent. In a third method stage the interstices 9 are filled with a filler material, for example an adhesive, because of which great stability is imparted to the structure. In a final fourth method stage, the front faces of the front area 3 near the shoulder 21, and the front faces of the coupling area near the shoulder 22, are polished. Each one of these method stages can include several method steps, each one in accordance with a different technology, known per se. The shoulders 21 and 22, which can also be omitted, are provided as an aid for mounting the diodes 10 at the front end and the optical fiber 11 on the outlet side.

With a negative structure, the desired number of strips 2 in the shape of vertical pits is produced in a first method stage by etching in accordance with a technology known per se. The eight tracks 2 in FIG. 6 can be interpreted as pits, for example. In a second method stage, the surfaces of these downward oriented pits are only slightly treated. These treated zones 24 are indicated in FIG. 3. These pits 2 are then filled in a third method stage with a transparent filler material 16', for example an adhesive, so that the actual optical waveguide strips are created. Finally, in a fourth method stage the front sides near the shoulder 21 and the front sides near the shoulder 22 are polished. Each one of these method stages can include several method steps, each one in accordance with a different technology, known per se. In this case, too, the shoulders 21 and 22 can be omitted, which actually are provided as an example of an aid for mounting the diodes 10 at the front end and the optical fiber 11 on the outlet side.

To cause total reflection, the filler material can have a refractive index $n_g < n_s$, at least in the boundary area next to a transparent strip 2. In the case of a negative structure, the boundary layer 24 (FIG. 3) also has a refractive index $n_{g'} < n_{s'}$, besides a transparent strip 16' made of a filler material with a refractive index $n_{s'}$.

It is generally very difficult to produce high narrow walls 2 (FIG. 2). However, it was learned through the invention that it is possible by means of so-called DRIE etching (Deep Reactive Ion Etching) to produce such walls or strips of a height of approximately 100 μm and a width of approximately 5 μm for the present application, in order to be able to use diode lasers with an illumination surface of 100×1 μm, for example.

Regarding the through-oxidation in connection with this application, it was also learned through the invention that oxide thicknesses up to 3.4 μm (or 6.7 μm) can be achieved by employing so-called moist oxidation at high temperatures of approximately 1200 C. The oxide thickness is a function of the available time. The adhesive 16, which is used as a sheath, preferably has a refractive index of 1.4 and is therefore less than 1.46 (= reflective index of $SiO_2$). With a negative structure it is possible to create a boundary layer 24 made of $SiO_2$ by means of a surface treatment of the pits 15 (FIG. 3) if, for example, an adhesive 103 of the EPO-TEK company, which has a refractive index of 1.57, is used. However, the surface treatment can also take place with the aid of the so-called PECVD method (Plasma-Enhanced Chemical Vapor Deposition), which utilizes gas discharge for precipitating thin layers, in particular layers of silicon nitride or silicon oxinitride, at low temperatures from the gas phase. The refractive index of the so-called SION layers, which are created by the substitution of di-nitrogen by ammonia, can be selected to lie in the range between 1.46 and 2, for example, and in the lower range is therefore less than the refractive index (1.57) of the mentioned adhesive 103. The adhesive must be selected in respect to several criteria. Particularly desired are the minimum damping of the light output in the desired wavelength, a suitable refractive index, low viscosity for casting, a relatively great hardness and little shrinkage. The adhesives OG 136 and/or 103 of the EPO-TEK company, for example, meet these requirements. Casting molds made of Teflon® can be used for casting.

The front faces 8 of the front areas 3 and/or the front faces of the coupling area 5 of the optical waveguide coupler are made as flat and smooth as possible. These front faces can be located in a plane which is perpendicular to the reference plane. The elongated narrow optical waveguide strips 2 can be arranged symmetrically in pairs in respect to the reference plane.

The optical waveguide couplers can be positive and/or negative strips 2, 16' of a height between 30 and 300 μm and a thickness between 1 and 30 μm, but preferably of a height between 80 and 120 μm and a thickness between 2 and 8 μm.

What is claimed is:

1. An optical waveguide coupler with a number of elongated narrow optical waveguide strips, each of which has a front area, a center area and a coupling area, in that the center area respectively comprises a transition area toward the corresponding front area, or toward the coupling area in such a way that the distance between two adjoining strips is greater in the front than the thickness of the narrow strips, and wherein the strips form a stack in the coupling area, characterized in that the optical waveguide coupler is constituted by a structure of a substrate with pits and of strips between the pits, and the strips in the form of the optical waveguide strips are comprised at least partially of a material of the substrate, or an optical waveguide material, constituting the optical waveguide strips, is embedded in the pits.

2. The optical waveguide coupler in accordance with claim 1, characterized in that the pits are created by etching the substrate, preferably by means of a DRIE method.

3. The optical waveguide coupler in accordance with claim 1, characterized in that positive and/or negative strips of a height between 30 and 300 μm and a thickness between 1 and 30 μm are provided in a substrate, which preferably consists of silicon.

4. The optical waveguide coupler in accordance with claim 1, characterized in that positive strips made at least partially of silicon oxide, and/or negative strips made of a filler material, are provided.

5. The optical waveguide coupler in accordance with claim 1, characterized in that the pits between the strips are filled with a filler material.

6. The optical waveguide coupler in accordance with claim 1, characterized in that the substrate includes at least one shoulder as a support for at least two optical transmitting elements and/or an optical fiber.

7. A method for producing an optical waveguide coupler in accordance with one of claims 1 to 6, characterized in that for producing a positive structure a desired number of strips with lateral walls between the pits is created in a first method stage by means of forming pits in a substrate, and in a further method stage the pits are filled with a filler material.

8. The method in accordance with claim 7, characterized in that prior to a further method stage, these walls are laterally chemically treated in a second method stage, or the surfaces of these pits are only slightly chemically treated for reducing the roughness of the surface.

9. The method in accordance with claim 7, characterized in that in the front area and/or in the coupling area the front faces of the strips are polished in a fourth method stage.

10. The method in accordance with claim 7, characterized in that the pits are produced by employing a DRIE etching method.

11. The method in accordance with claim 7, characterized in that a through-oxidation of the strips is caused by using a moist oxidation method at a high temperature.

12. The method in accordance with claim 7, characterized in that a surface treatment of the pits is performed with the aid of a PECVD method in order to create thin boundary layers.

13. The method in accordance with claim 7, characterized in that a filler material with a refractive index of at least approximately 1.4, or a filler material with a refractive index of at least approximately 1.57 is used.

14. The method in accordance of claim 7, characterized in that the boundary layers of the strips are produced by employing a SION method in such a way that a refractive index results, which is less than 1.57.

15. A method for producing an optical waveguide coupler characterized in that for producing a negative structure a number of pits corresponding to the desired number of strips is produced in a substrate in a first method stage, and in a further method stage these pits are filled with a transparent filler material, so that the actual optical lightwave strips are created.

16. The method in accordance with claim 15, characterized in that that prior to a further method stage, the surfaces of the pits are only slightly chemically treated for reducing the roughness of the surface.

17. The method in accordance with claim 15, characterized in that in the front area and/or in the coupling area the front faces of the strips are polished in a fourth method stage.

18. The method in accordance with claim 15, characterized in that the pits are produced by employing a DRIE etching method.

19. The method in accordance with claim 15, characterized in that a through-oxidation of the strips is caused by using a moist oxidation method at a high temperature.

20. The method in accordance with claim 15, characterized in that a surface treatment of the pits is performed with the aid of a PECVD method in order to crate thin boundary layers.

* * * * *

UNITED STATES PATENT AND TRADEMARK OFFICE
CERTIFICATE OF CORRECTION

PATENT NO. : 6,501,885 B2
DATED : December 31, 2002
INVENTOR(S) : Reto Holzner et al.

It is certified that error appears in the above-identified patent and that said Letters Patent is hereby corrected as shown below:

<u>Title page,</u>
Item [75], the inventor information is incorrect and should read as follows:
-- Reto Holzner, Zurich (CH)
Thomas Brunschwiler, Arbeff (CH)
Josef Wagner, Lochen (CH)
Alex Dommann, Buchs (CH)
Klaus Mündle, Satteins (AT)
Jakob Jütz, Grabs (CH) --

Signed and Sealed this

Nineteenth Day of August, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,501,885 B2 Page 1 of 1
DATED : December 31, 2002
INVENTOR(S) : Reto Holzner et al.

It is certified that error appears in the above-identified patent and that said Letters Patent is hereby corrected as shown below:

<u>Title page,</u>
Item [75], the inventor information is incorrect and should read as follows:
-- Reto Holzner, Zurich (CH)
Thomas Brunschwiler, Arbon (CH)
Josef Wagner, Lachen (CH)
Alex Dommann, Buchs (CH)
Klaus Mündle, Satteins (AT)
Jakob Jütz, Grabs (CH) --

This certificate supersedes Certificate of Correction issued August 19, 2003.

Signed and Sealed this

Twenty-fifth Day of November, 2003

JAMES E. ROGAN
*Director of the United States Patent and Trademark Office*